United States Patent [19]

Wegmann et al.

[11] B 3,923,452

[45] Dec. 2, 1975

[54] AMINE SALT OF A DYESTUFF IN A KETONE SOLUTION

[75] Inventors: Jacques Wegmann, Bettingen; Carl Becker, Basel; Guenther Zwahlen, Dornach; Werner Kuster, Basel, all of Switzerland

[73] Assignee: Ciba-Geigy AG, Basel, Switzerland

[22] Filed: Apr. 5, 1973

[21] Appl. No.: 348,383

[44] Published under the Trial Voluntary Protest Program on January 28, 1975 as document no. B 348,383.

Related U.S. Application Data

[63] Continuation of Ser. No. 94,947, Dec. 3, 1970, abandoned.

[30] Foreign Application Priority Data

Dec. 3, 1969 Switzerland.................... 18045/69
Jan. 8, 1970 Switzerland........................ 156/70
Jan. 30, 1970 Switzerland...................... 1297/70

[52] U.S. Cl.............................. 8/1 XA; 8/39; 8/42; 8/94; 8/173; 8/174
[51] Int. Cl.²........................................... D06P 1/10
[58] Field of Search........ 8/94, 173, 174, 39, 1 XA, 8/42 R

[56] References Cited
UNITED STATES PATENTS

| | | | |
|---|---|---|---|
| 2,828,180 | 3/1958 | Sertorio | 8/62 |
| 3,129,053 | 4/1964 | Castle | 8/94 X |
| 3,342,542 | 9/1967 | Morf et al. | 8/173 |
| 3,510,243 | 5/1970 | Seuret et al. | 8/94 X |
| 3,663,161 | 5/1972 | Litzler et al. | 8/174 X |
| 3,674,420 | 7/1972 | Sapers | 8/173 |

Primary Examiner—Benjamin R. Padgett
Assistant Examiner—P. A. Nelson
Attorney, Agent, or Firm—Joseph G. Kolodny; Edward McC. Roberts; Prabodh I. Almaula

[57] ABSTRACT

A process for the manufacture of coloured shaped articles from high polymer synthetic resins, wherein water-insoluble, hydrophobic, high polymer synthetic resins in solid form, especially in the form of granules or powders, in a mixture of hydrophilic and organophilic solvents that are reciprocally soluble in one another only to a limited extent and form a two-phase system, are treated with dyestuffs or optical brighteners, the solubility of which in the organophilic portion of the two-phase system is greater than in the hydrophilic portion, the solvent is removed, the synthetic resin dried and shaped, optionally with addition of untreated high polymer fully synthetic resin, from the melt or from a solvent.

5 Claims, No Drawings

AMINE SALT OF A DYESTUFF IN A KETONE SOLUTION

This is a continuation of application Ser. No. 94,947, filed on Dec. 3, 1970, now abandoned.

The dyeing of synthetic, high polymer resins during their manufacture in bulk is economically very advantageous, and allows a high degree of fastness and levelness to be attained, even over large batches.

The dyestuffs can, for example, be stirred in during the polymerisation or polycondensation. In order to achieve a good distribution, however, it is necessary to disperse the dyestuff previously in monomers (for polyamides, e.g., in caprolactam, for polyester, e.g., in ethylene glycol). The danger of unfavorably influencing the properties of the polymer, the inflexibility in change of shade due to the very large batches and the difficult and costly cleansing of the machinery, have meant that this process is used virtually only for matting and for dyeing black with the addition of carbon black.

Instead of this process, the attempt has been made to carry out the dyeing after polymerisation has taken place, and to dye the plastics in the form of powder, flakes or granules. In this case too, many difficulties remain to be overcome.

The granules can, for example, be dusted in the very finely ground dyestuff powder. The process is, however, largely impossible to carry out because the granules are conveyed pneumatically, in the process of which a large amount of the pigment dye is expelled and leads not only to high dyestuff losses, but also to a rapid clogging of the filter.

The attempt has therefore been made to dye the granules from an aqueous bath, at high temperatures and with the aid of swelling agents - polyester, for example, with disperse dyes, polyamides on the other hand with the aid of heat resistant vat dyestuffs (Chem. Abstracts 69,783,585, 1968). Despite lengthy dyeing times and high temperatures, the yields are, however, as a rule poor, especially in the case of the faster dyestuffs, and the choice of suitable dyestuffs is correspondingly small.

It has now been found that synthetic resins of the most widely varying kinds such, for example, as polyamides, polyesters, polyolefins, especially polyethylenes and polypropylenes, polyacrylonitriles, polyacetals, polycarbonates, polysulfones as also ionomer and other synthetic resins, which on manufacture occur in the form of cables cut into small dites of approx. 3 to 4 mm diameter, or in the form of powder or flakes, can be reacted with a large selection of dyestuffs belonging to different classes to attain fastness properties and in a very short time in virtually quantitive yield, if the synthetic resins are reacted with the dyestuff in a mixture of solvents, which are soluble in one another to a limited extent and form a two-phase system, and are shaped after removal of the solvents into fibers, filaments, sheets or shaped articles.

The invention thus provides a process for the manufacture of colored shaped articles from high polymer synthetic resins, wherein water-insoluble, hydrophobic, high polymer synthetic resins in solid form, especially in the form of granules or powder, in a mixture of hydrophilic and organophilic solvents that are reciprocally soluble in one another only to a limited extent and form a two-phase system, are treated with dyestuffs or optical brighteners, the solubility of which in the organophilic portion of the two-phase system is greater than in the hydrophilic portion, the solvent is removed, the synthetic resin dried and shaped, optionally with addition of untreated high polymer fully synthetic resin, from the melt or from a solvent.

Since preferably water or an aqueous solution, for example of a salt, is suitable as hydrophilic agent, a particularly important embodiment of the process according to the invention is characterized in that water-insoluble, hydrophobic, high polymer synthetic resins in solid form, especially in the form of granules or powder, are mixed with water-insoluble dyestuffs or optical brighteners dissolved or finely distributed in organic solvents that are water-soluble to a limited extent, and with a sufficient amount of water that a two-phase system is formed with water as the quantitively predominant phase, until the organic phase has become dispersed uniformly on the surface of the synthetic resin, the organic solvents and the water are removed, the synthetic resin dried and shaped, optionally with addition of untreated high polymer fully synthetic resin, from the melt or from a solvent.

The basic feature of the process is the clear formation of the two-phase system. The organic phase, which takes up the dyestuff, whether as solution or as very finely disposed suspension, coats the plastic granules with a fine, delicate film possessing good fixation. The dyestuff is therefore absorbed very rapidly and completely, though in the first instance it is purely a matter of a surface dyeing.

By raising the temperature and lengthening the treatment time, it is possible to promote the penetration of the dyestuff into the granules, in certain instances until complete, homogenous penetration of the dye is achieved — a process, however, that in most cases is neither technically necessary nor economically justifiable. The dyeing process must be carried out solely for so long that an optional dyestuff yield results and that the dyestuff coating adheres so well that in the subsequent operations it does not give rise to losses due to abrasion.

The claims to be made of such a temporary dyeing by means of coating are, therefore, of a very different order from those that have to be fulfilled by the dyeing of finished shaped synthetic resins, particularly as regards fastness to rubbing, distribution and brilliance of shade.

The literature on the admixture and dyeing in the presence of organic solvents in the dyeing of finished, shaped synthetic resins, for example in the form of fibres, is very comprehensive. Both solvents that are water-mixeable and water-insoluble and their mixtures have been proposed. In every case, however, one criterion was of especial importance and emphasized accordingly: a single phase system was used and care taken that a second phase did not result, e.g., through an excess of solvent, whether from corresponding dosing or the addition of dispersing agents or emulsifiers. The reason for this lies in the fact that damaging of the fiber and staining occur due to the action of the solvent that acts as swelling agent.

In the process of the instant invention, the opposite is the case. A two-phase system that has clearly settled out must be present, and each addition of emulsifiers or of water miscible solvents or other substances that could interfere with or prevent the formation of a two-phase system must, therefore, be carefully avoided, since the transfer of the dyestuff would thereby be detrimentally affected.

In contrast to the dyeing process for fibers, it is in the present case unnecessary, and even for that matter undesirable, if the solvent is capable of swelling or even dissolving on to the synthetic resin. Solvent residues can bring about a sintering or agglutination of the granules on dyeing, or can influence the melting viscosity in such a way that the colored synthetic resin granules can no longer be shaped, or can be shaped only with difficulty.

The organic solvent should, on the other hand, form on the surface of the granules a film with good fixation containing as for as possible the entire dyestuff, and from where, due to the sharp fall in concentration and to the easy and soft removeability of the solvent, the dyestuff can settle on the surface of the synthetic resin in a compact layer that adheres well.

In order to promote the homogeneity of the deposited dyestuff layer, it is important that the dyestuff is present in the organic phase in as finely distributed a form as possible. Ideal, but not realizable in every case, is true solution.

Fine distribution of the dyestuffs can also be achieved by mechanical methods for example grinding in a solvent by means of a sand or glass ball mill. It is also advantageous in many cases to bring the dyestuff into fine distribution before conversion into the solvent by means of recrystallization or reprecipitation, for example by recrystallization from a concentrated acid solution (such as sulfuric acid, phosphoric acid, glacial acetic acid, chloroacetic acid) by pouring onto water.

In many instances, complex salt formation with strong alkalies is also suitable for this purpose. For example, many dyestuffs can be dissolved in ketones by addition of a strong alkaline amine or an inorganic alkali or alkaline earth hydroxide such, for example, as methylalcoholic potassium hydroxide solution.

Particularly advantageous for the present invention are those dyestuffs that dissolve in the polymer under the conditions of the shaping process. This can be detected in that the particles of the dispersion that are visible originally under a light-optical microscope and which are in the order of magnitude of 0.1 to 1 micron, are no longer discenable within the shaped substrate, whereas this is still the case with the insoluble pigments. Moreover, there is the qualitative criterion that the dyeings that contain the dyestuff in dissolved form, are distinguished by transparency and particularly great brilliance and tinctorial strength.

If pigments in the narrow sense are used, i.e., products that are retained in the high polymer synthetic resin as insoluble particles, it is necessary to predisperse these before the application according to the invention by means of those carrier resins that are compatible with the synthetic resin to be dyed.

Suitable water-insoluble dyestuffs are disperse dyestuffs, vat dyestuffs and pigments as also dyestuff lacquers. They may belong to the most diverse classes of constitution.

The process according to the invention is applicable in like manner to water-insoluble optical brighteners as well as to fillers. Mixtures of dyestuffs, optical brighteners etc. can also similarly be used.

Disperse dyestuffs that may be mentioned are, for example, the azo and azomethines, the stilbene derivatives, the nitro dyestuffs, the naphthoquinone and anthraquinone dyestuffs, as also the heterocycles, for example thiazolanthrones, quinophthalones, anthrapyrimidines, naphthalimides, pyrazolanthrones, diazines, acridines and acridones as well as the 1:1 and 1:2 metal complex dyestuffs, for example of azo and formazyl dyestuffs, which contain Al, Ni, Cu, Fe, Co and Cr as complex forming metal. Metal complex dyestuffs are especially valuable for synthetic resins of the polyamide type.

It is particularly advantageous to use the amino salts that are easily soluble in organic solvents.

In the case of the vat dyestuffs, the simple acylated anthraquinone derivatives are especially to be mentioned. In addition, cyanuric chloride derivatives, carbazoles, acridones and polycyclic rings, for example acedianthrone, dibenzanthrone perinone, perylene, also naphthimidazoles, dipyrazolanthronyls and ingoid dyestuffs, such as indirubin, indigo, thioindigo derivatives, especially also esters of vat acids as are described in French Pat. No. 1,009,309.

Vat dyestuffs may also be used in the form of the free vat acid.

Suitable pigments for the process according to the invention are: inorganic pigments, such, for example, as carbon black or delustring agents such as titanium dioxide, especially, however, organic pigments, for example those of the class of the azo, anthraquinone, phthalocyanine, nitro, perinone, perylenetetracarboxylic acid diimide, dioxazine, thioindigo, diisoindolinone or quinacridone dyestuffs; furthermore, metal complex dyestuffs of pigment character and optical brighteners having pigment character. The dyestuffs or optical brighteners can be used both in pure undiluted form as powders, pastes or suspensions; but the dyestuffs etc. to be applied to the substrate can also be used in the form of preparations. It is, for example, frequently of advantage on using pigments that are insoluble in the substrate if, instead of the pure pigments, so-called pigment preparations are used in which the pigments are already present in very finely distributed form in a solid carrier that is compatible with the substrate and which does not influence the application in a negative way. Such pigment preparations possess the advantage that a uniformly fine distribution of the pigment particles in the substrate is achieved on the melting of the pigmented plastic granules; whereas insoluble pure pigments in the substrate often lead to a poor pigment distribution.

Such pigment preparations can be prepared, for example, by kneading or wet grinding pigments with pulverulent carrier resins, or also according to the process of the present invention. The carrier resins can be of the same kind as the material to be dyed, for example of polyamide-6 or polyethyleneglycol-terephthalate, but they can also be of other resins or some other substances which are compatible with the synthetic resin to be dyed such, for example, as magnesium abietate, ethylcellulose or colophony ester, or also co-polymers of vinyl chloride and vinylacetate or similar resins. If dyestuffs, pigments etc. are prepared in the form of solid preparations, then a carrier is used that is virtually insoluble in the solvents employed.

As solvents that are of limited solubility in water and form organophilic or organic phases there may be mentioned: aldehydes, for example benzaldehyde and furfurol, esters, for example ethyl acetoacetate, amylacetate, dimethylphthalate, acetols, especially, however, alcohols, for example n-butanol, 1-pentanol, 2-pentanol, n-hexanol, n-octanol, benzyl alcohol, phenetol, hexylglycol, phenylglycol, cyclohexanol, as also ketones, for example methylpropyl-, methyl-isoamyl-, methyl-n-amyl-, ethylbutyl- and diisobutylketone, furthermore mesityloxide, isophoron, acetophenone, acetal, benzonitrile, n-hexylamine, acrylonitrile, ethylene chloride, propylene carbonate, isopropylacetate, hexycellosolve, phenylcellosolve, acetylacetone, but especially cyclohexanone and methylcyclohexanone mixtures of various solvents can also be used. Solvents such as nitrobenzene, chlorobenzene and chlorophenols are also suitable of course, but they smell so strongly that it is unpleasant to work with them.

As organic phase, those organic substances can also be used that are solid at ambient temperature and that form a liquid two-phase system only at elevated temperature. Such substances are, for example, p-dichlorobenzene; naphthalene, soft paraffins etc. On using such substances, temperatures above melting point are employed (in the case of p-dichlorobenzene, for example, above 60°C).

Particularly advantageous are solvents that are non-poisonous, do not smell strongly and that can be removed easily and completely, for example cyclohexanol, cyclohexanone and benzylalcohol.

By limited solubility in water is to be understood a solubility of at least 0.1%, i.e. one gram of solvent should dissolve in one liter of water at ambient temperature. The solubility, however, should not exceed an upper value of approx. 10%, since otherwise too much solvent is lost.

The limited degree of solubility performs a useful function, for together with the water as reaction medium, it permits the quality of the resulting film on the granules to be regulated. The water acts not only as carrier and transfer medium, but also as quasi cushion or buffer. If the film is not compact or homogenous, then more solvent must be added; if, on the other hand, its adhesiveness is poor or if it is not absorbed quantitively, then this can be regulated by increasing the amount of water.

As has been already mentioned, the aqueous phase can contain substances that are dissolved such, for example, as acids, bases, or also neutral electrolytes such, for example, as salts, provided they do not exert an unfavorable influence on the formation of the two-phase system. In many instances, the solubility of the organophilic phase in water can be lowered by means of such additives.

The amount of solvent that is required for the formation of the organic phase depends on the one hand on the total surface of the granules; on the other hand, it is also dependent on the constitution of the dyestuff and its mode of distribution. For the granules, it is approx. 2.5 to 20%; as a rule 10%. The possibility of being able to regulate with the water also allows different dyestuffs to be combined. Initially, a concentrated amount of solvent is used, which is then successively diluted with water.

A liquor ratio of 1:1 proves satisfactory for technical and economic reasons. For example, 1,000 parts of granules are coated in 900 parts of water and 100 parts of solvent, which contain 10 parts of dyestuff or brightener dissolved or dispersed.

The amount of dyestuff can vary between 0.1 to 10%, but is preferably 1 to 5%. It is preferred to carry out dark dyeings and to mix subsequently with untreated granules. The upper limit is determined by divisibility and adhesiveness. Average values are the most satisfactory and yield particularly level dyeings.

The duration of the treatment can be just as long as it takes to give the solvent sufficient time, by purely mechanical means, to become distributed homogeneously on the whole granule mass. Initial unlevelness is not dangerous. If there is sufficient solvent present, then complete levelling occurs in a very short time. The duration of the treatment thus fluctuates between approx. 30 seconds and 3 hours. It is preferably in the range of a few minutes for large batches.

The temperature can lie between ambient temperature and the boiling point of the solvent. If the solubility of the dyestuff does not require any higher temperature, then ambient temperature is to be preferred.

Various other additives, for example those that are useful for improving the synthetic resins, can be added to the solutions or suspensions of the dyestuffs in the solvent, provided these additives are compatible with the substrate to be dyed, that they do not influence the two-phase system and do not alter the moulding properties of the granules, for example, by lowering the melting viscosity.

The sequence in which the individual constituents required for the process are given to one another is, on observing certain points, very largely of no importance. The dyestuff can be distributed in the solvent, given to the water and then the granules are introduced or already added beforehand. It is also possible, however, to mix the dyestuff distributed in the solvent with the granules and only then to add the water. It is important that the dyestuff should be present in the solvent in very finely distributed form before it comes into contact with the granules.

Solvent pastes can, for example, be prepared that contain 5 to 50%, but preferably approx. 10 to 25% of the dyestuff and are standardized.

If granules are high-percentage dyed, i.e. as strongly as possible, for example 8% strength pentration dyed, in order to blend them subsequently for light dyeings, for example 0.2% strength, then this can be done by mixing treated and untreated granules in the ratio 1:40 until a uniform distribution is attained. The treated granules, however, can also be melted separately by themselves and added in the appropriate ratio to the similarly melted, untreated polymers. This type of procedure is indicated especially in the case of optical brighteners, the activity of which, as is known, come into play in very slight concentrations of 0.1 to 0.2%.

The liquid of the organic phase must be removed for the processing of the two-phase, deep-dyed systems. This can be done according to various methods, for example by simple distillation, by azeotropic distillation or by steam distillation, wherein in each case the process is carried out both at normal pressure and at reduced pressure. The preferred embodiment is, however, to dilute the hydrophilic phase, in which the organophilic phase is only of limited solubility, to such an extent that the total amount of liquid of the organophilic phase is dissolved in the hydrophilic phase. In the case of water or aqueous salt solutions being used as the hydrophilic phase, the dilution is carried out advantageously with water. The solubility of the organophilic phase in the hydrophilic phase can, however, also be raised by means of dilution, for example, with a water-miscable organic solvent, for example with ethanol, and/or by addition of hydrotropic substances. Use of these possibilities is especially made whenever a solvent that is water-insoluble is chosen as organophilic phase.

The dyed or pigmented granules can be easily separated and dried by filtration from the hydrophilic, as a rule aqueous, phase after removal of the organophilic, liquid phase.

If plastic powders are used instead of plastic granules, then the process can be used for the manufacture of solid pigment preparations. This represents a further subject of the present invention. If according to the process of the present invention plastic powders are used, then on the one hand much larger amounts of solvent are necessary — approx. 10 to 100 times as much — on account of the much larger surface of the powder as compared with granules, and in addition, much larger amounts of dyestuff are reacted with the plastic; for it is economically a necessity for the processing of powder to manufacture high-percentage preparations — so-called "master batches" — and to mould mixed with untreated plastic powder, granules, solutions or melts.

In powder form there are available preferably, for example, synthetic resins of polyolefines, for example polyethylene and polypropylene, as also acrylonitrile and its mixed polymers with acryl derivatives, for example acrylic acid and vinyl acetate. They are processed in the manufacture of fibers according to the melt or solution spinning process. Polyamides and polyester can also be obtained as powders.

If a solvent amount of 5 to 10% is used for granules, then powders require approx. 500 to 1,000% relative to the weight of the plastic. For example, 100 parts of polyacrylonitrile are stirred into a mixture of 100 parts of dyestuff in 1,000 parts of solvent and 5,000 to 9,000 parts of water. There is obtained from this a preparation with a dyestuff content of 50%, which in the processing is to be blended in the ratio 1:50 in order to yield a 1% strength dyeing. The shaping after the solution spinning process favor this process, since no mixing difficulties occur as in the melt.

The ratio of dyestuff to solvent remains - which is very important — in the same order of magnitude as in the reaction of granules, i.e., a 10% strength solution or a fine dispersion respectively can be taken as average standard value. The conditions with regard to the fine distribution of the dyestuff remain the same.

In order to guarantee as intimate a mixture as possible of the synthetic resin with the large amount of dyestuff present in the solvent, the treatment must be intensified in comparison to the granules; this can be achieved by means of elevated temperature, for example 60° to 95°C, and lengthy period of treatment and/or by additional mechanical processing, for example intensive stirring or shaking, or for example acoustic irradiation with ultrasonics.

The processing of this two-phase system is carried out according to the methods indicated above for granules etc.

Suitable synthetic resins that can be treated according to the process according to the invention are especially the thermoplastic synthetic resins and resins that are free of halogen atoms, such, for example, as the polyamides, polyesters and polyolefines, chiefly polypropylene.

As synthetic resins of the polyamide type may be mentioned, for example, polyamide-6 from caprolactam and polyamide-6,6 from adipic acid and hexamethylenediamine, also polyamide-4,7,8,9,11,12 and polyamide-6,8 and 6,10.

Polyester resins present in granule form are, for example, polyethyleneglycolterephthalate and poly-1,4-cyclohexanedimethanolterephthalate. Like the granules of polyamide, they can similarly be delustred for example with titanium dioxide or contain pigments such, for example, as carbon black.

These resins are shaped in every case from the melted polymer after the melt spinning process.

A further important synthetic resin to which the process according to the invention is preferably applied is polyacrylonitrile, which is used preferably in powder form. The shaping into fibers and filaments is carried out after the solution spinning process.

Water-insoluble or alcohol-soluble basic dyestuffs are particularly suitable for dyeing polyacrylonitrile according to the process of the present invention. As examples may be mentioned: di- and triphenylamino-triphenylmethane, which yield very fast and brilliant, transparent green or blue dyeings. Red to violet shades are obtained with the hexyl derivatives, as are described in U.S. Pat. No. 3,439,004.

In general, non-ionized dyestuffs are preferred.

In the case of vat and disperse dyestuffs, for which it is particularly advantageous to promote the fine distribution by means of initial reprecipitation, isolation of the finely distributed dyestuff is often not necessary. Such isolation is all the more difficult the more colloidally the dyestuff precipitates. Instead, the precipitation can be carried out in the presence of the solvent, preferably with intensive stirring and/or acoustic irradiation with ultrasonics, and then the plastic powder is stirred in. After the diluted acid has been decanted, the further processing remains the same.

If the dyestuff is precipitated from an acid, the synthetic resin can also be added to the acid solution beforehand. The dyestuff and the synthetic resin then precipitate in very fine particles on the introduction of the acid solution into the solvent. The synthetic resin can, however, also be stirred into the two-phase system and the dyestuff solution subsequently introduced into it. To effect a precipitation in an alkaline medium are suitable, for preference, the ketones of limited water-solubility, for example cyclohexanone and mesityloxide with strong alkalies such, for example, as methylalcoholic potassium hydroxide solution, since the dyestuffs dissolve best of all in these.

The process of the present application is new. It allows granules or powders of synthetic resin to be dyed in an extraordinarily simple and speedy manner. The dyed synthetic resins occur in a form excellently suitable for the further processing, especially for shaping into fibres, filaments or films. The dyed granules are particularly abrasion-proof and therefore chiefly suitable for melt spinning, wherein the dyed granules are conveyed pneumatically to where they are to be shaped. The resulting dyeings are exceedingly level and homogenous.

In the following Examples, the parts and percentages are by weight unless otherwise stated.

EXAMPLE 1

One part of trichloro-isouiolanthrone is reduced at 60° to 70°C in 80 parts of water with addition of 2.5 parts of 10 N sodium hydroxide solution and 1 part of sodium dithionite, and converted into the vat acid with diluted acetic acid. Ten parts of benzylalcohol are further added and the whole mixed with 100 parts of polyamide-6 in granule form. The mixture is thoroughly shaken until the organic phase has become evenly distributed on the granules. The aqueous phase is decanted and the granules rinsed and dried in vacuo at 100°C.

The granules are shaped into fibres according to the melt spinning process. These fibres exhibit a strong and very fast navyblue shade.

If equal parts of dimethoxydibenzanthrone are substituted for the dyestuff mentioned above and the process is carried out otherwise as described, a fast brilliant green is obtained.

If instead of benzylalcohol cyclohexanone is used, and granules of polyester are used instead of granules of polyamide, then a brilliant violet result is the first case, and similarly a fast green in the second.

A brownish red is obtained with 5,5'-diaminoanthrimidecarbazol, and a golden yellow with its dibenzoylamino derivative. All dyeings are distinguished by brilliance and good fastness.

EXAMPLE 2

One part of 5-benzoylamino-isoviolanthrone is dissolved at boiling temperature in 10 parts of cyclohexanone and introduced into 90 parts of hot water. Thereafter 100 parts of polyester granules are introduced into the mixture which is well stirred and allowed to cool. The aqueous phase is decanted and the granules rinsed and dried in vacuo. The granules are spun according to the melt spinning process and yield dyed fibres in a yellow shade fast to washing and light.

If instead of the dyestuff mentioned above equal parts of 1-oxy-4-anilino-anthraquinone are used, a very fast blue is similarly obtained. An attractive red is obtained with 1-oxy-4-benzoylamino-anthraquinone, also with 1-amino-2-bromo-4-oxy-anthraquinone.

If mesityloxide is used instead of cyclohexanone, then similarly good results are obtained.

EXAMPLE 3

Ten parts of naphthacridone (C.I. Vat Red 35 C.I. No. 68,000) are homogeneously distributed in 140 parts of cyclohexanone and 10 parts of a 20% strength methylalcoholic potassium hydroxide solution.

Fifteen parts of this preparation are stirred into 85 parts of water and neutralized by addition of 5 parts of glacial acetic acid. After addition of 100 parts of polyamide-6 granules, the whole is shaken, the water decanted and the dried granules spun according to the melt spinning process. The resulting polyamide fibres possess a strong, fast brown dyeing.

If instead of cyclohexanone equal parts of methylpropylketone, methylisoamylketone, methyl-n-amylketone, ethyl-butylketone, di-isobutylketone, isophoron or mesityloxide, and the process is carried out otherwise as described above, then good results are similarly obtained.

If polyester granules of polyethylene-glycolterephthalate are used instead of polyester granules and the process is carried out otherwise as described, then a reddish brown dyeing possessing very good properties of fastness is similarly obtained.

EXAMPLE 4

Ten parts of the 1:2-chromium complex of the azo dyestuff obtained by the coupling of diazotized nitroaminophenol to β-naphthol are dissolved in 40 parts of cyclohexanone.

Five parts of the above mentioned preparation are introduced into 95 parts of water and 100 parts of polyamide-6 granules added. The mixture is stirred until a complete, homogeneous distribution is attained and diluted with water. The liquid is decanted and the granules rinsed and dried in vacuo at approx. 100°C.

After the granules have been spun on a melt spinning machine, fibres are obtained that are dyed in rich and brilliant reddish black shades fast to light and washing.

An equally good result is also obtained on polyamide-6,6 granules.

If instead of undyed granules those are used that in the polymerization were pigmented by addition of 2% finely dispersed carbon black, and the process is carried out otherwise as described above, then a particularly fine and deep black is obtained such as cannot be obtained with carbon black alone, even with much larger amounts than 2%.

If 100 parts of a granulate are dyed with a preparation consisting of 4 parts of dyestuff and 10 parts of cyclohexanone or of 8 parts of dyestuff and 10 parts of cyclohexanone, and the dyed granules are mixed before shaping with 300 or 700 parts of undyed granulate, then an equally strong black dyeing of like quality is obtained or with the dyeing mentioned above.

If the cyclohexanone is substituted by one of the following solvents and the process is carried out as described, then similarly good results are obtained: n-butanol, n-penanol, 2-hexanol, n-octanol, cyclohexanol, methylcyclohexanon.

EXAMPLE 5

One part of the optical brightener of formula

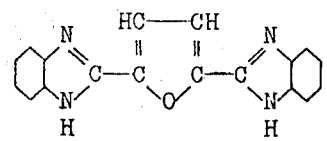

is dissolved in 10 parts of benzylalcohol and the solution introduced into 90 parts of water at 60°C. One hundred parts of polyamide-6 granulate delustred with titanium dioxide are added with stirring, the whole is thoroughly stirred and the water decanted. The granules are dried in vacuo at 100°C.

The granules thus pre-treated are intimately mixed with 1900 parts of delustred but untreated granules and subsequently spun on a melt spinning machine.

The fibres have a particularly clear, fine white shade possessing excellent fastness to light.

If instead of the optical brightener of the above formula 4,4'-bis-(2-p-methylphenyl-1,3,4-oxdiazolyl-5)-stilbene is used, an equally good result is attained.

EXAMPLE 6

One part of 5-amino-isothiazolanthrone is dissolved in 9 parts of cyclohexanone with addition of 1 part of 20% strength methylalcoholic potassium hydroxide solution. The mixture is diluted with 90 parts of water, neutralized with 1 part of glacial acetic acid and 100 parts of polyamide-6 granulate is introduced. The whole is shaken until the organic phase has precipitated on to the granules in the form of a surface film, the colorless aqueous phase is decanted as far as possible, and the chips are dried in a vacuum cabinet at approx. 100°C.

EXAMPLE 7

One hundred parts of the rosin amino salt of the 1:2 chromium complex of the azo dyestuff from anthranilic acid and phenylmethylpyrazolone are dissolved in 300 parts of cyclohexanone.

Sixteen parts of this preparation are introduced into 100 parts of water and 400 parts of polyamide-6 granulate are added with thorough stirring. Slowly and with stirring, a further 300 parts of water are added and the mixture stirred until the preparation has become evenly distributed on the granules. The aqueous phase is thereafter decanted and the granules are dried and spun according to the melt spinning process. A completely transparent and brilliant yellow is obtained that is fast to light and washing. A similarly good result is also attained on granules of polyamide-6,6.

If the azo dyestuff from 2-aminobenzoic acid-5-sulphamide is used and the process as described above is carried out, then a fast yellow is similarly obtained. A fast and equally brilliant orange is obtained with the azo dyestuff from 2-aminophenyl-4-methylsulphone and m-chlorophenylmethylpyrazolone. A fast brown is obtained with the azo dyestuff mixture from 2-amino-4-nitrophenol and β-naphthol or phenylmethylpyrazolone resp.

If mesityloxide or isophorone is used instead of cyclohexanone, then similarly good preparations and correspondingly good dyeing results are obtained with all rosin amino salts of the 1:2 chromium complex of the above mentioned dyestuffs.

If the 1:2 chromium complex of the azo dyestuff from nitro-aminophenol and dichloro-α-naphthol is used, which is present presumably as the water-insoluble sodium salt, or that of the dyestuff from nitro-aminophenol and β-naphthol, then fast navy blue or black shades resp. are obtained according to the above direction.

If instead of the rosin amino salt, the pigment of the 1:2 chromium complex of the azo dyestuff from 5-nitro-2-aminophenol and phenylmethylpyrazolone is used which is obtained by reaction with rhodamine B, there results a substantially more brilliant red in comparison to the amino salt.

EXAMPLE 8

Ten parts of 1,4-diphenylamino-anthraquinone are ground in a bead mill to a finely dispose paste together with 90 parts of cyclohexanone.

Ten parts of the dyestuff preparation are given to 90 parts of water and 100 parts of polyester granulate are stirred in. The water is decanted and the granules are dried in vacuo at approx. 100°C.

After the granules have been spun on a melt spinning machine, dyed blue-green fibres are obtained in fast shades.

EXAMPLE 9

Ten parts of 1,5-dibenzoylamino-anthraquinone are stirred to a homogeneous paste in 80 parts of cyclohexanone and 10 parts of 20% strength methylalcoholic potassium hydroxide solution.

Ten parts of this preparation are given to 90 parts of water and 5 parts of glacial acetic acid and 100 parts of polyester granules are stirred in. The water is subsequently decanted and the granules dried in vacuo at 100°C. After the latter have been spun, a strong, brilliant and very fast yellow dyeing of the polyester fibres is obtained.

With 1,5-di-(p-dichlorobenzoylamino)-anthraquinone a more greenish yellow is obtained; with 1,5-(2,4-dichlorobenzoylamino)-anthrquinone a more reddish yellow. A fast reddish brown is obtained with 1,4-dibenzoylamino-anthraquinone, whereas the condensation product of 2 mols of 1-amino-4-methoxy-anthraquinone with 1 mol of cyanuric chloride and 1 mol of ammonia yields a fast, yellowish red.

A particularly greenish yellow is obtained with indigo yellow 3 G, a dyestuff that is obtainable by condensing indigo with benzylchloride.

Indirubin, which is prepared by condensing isatin with indoxyl, yields a luminous violet.

EXAMPLE 10

Ten parts of dibromopyranthrone (C.I. vat orange 2 C.I. No. 59,705) are dissolved at 0° to 5°C in 100 parts of 96% strength sulfuric acid, poured into 900 parts of water with stirring, filtered with suction and washed free of acid. The filtrate is stirred to a homogeneous paste with 90 parts of cyclohexanol and the water that has separated out is removed.

Thereafter 10 parts of this dyeing preparation are introduced into 90 parts of water and 100 parts of polyester granules are stirred in. After thorough stirring, the water is decanted and the granules dried in vacuo at approx. 100°C.

The fibres that are obtained after spinning exhibit a brilliant and transparent golden orange shade of very strong fastness to light and washing.

A fast brown is obtained with acedianthrone and with 4,4'-dimethyl-6,6'-dichloro-thioindigo, a transparent and very fast brilliant pink.

EXAMPLE 11

Ten parts of di-isopropyl-dipyrazolanthonyl (C.I. Vat Red 34) are dissolved at 0° to 5°C in 100 parts of 96% strength sulfuric acid, and poured into 900 parts of water. The precipitate is filtered with suction, washed free of acid, triturated with ethylene chloride, washed with alcohol and water and ground to a homogenous paste with 90 parts of cyclohexanone.

Ten parts of the above mentioned dyeing preparation are suspended in 90 parts of water and 100 parts of polyester granules are stirred in. After the organic phase has become uniformly distributed on the granules, the water is decanted and the granules are dried in vacuo at approx. 100°C. After the granules have been melt spun, fibres dyed in brilliant, fluorescent scarlet shades of strong fastness to light and washing are obtained.

EXAMPLE 12

Twenty parts of the optical brightener of formula

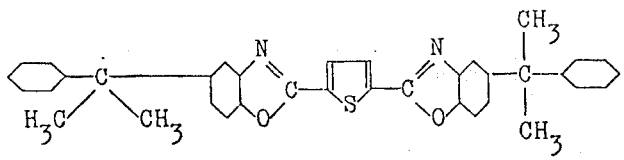

are ground in a bead mill in 80 parts of cyclohexanone until a very fine dispose paste results.

Ten parts of the preparation prepared in the above manner are suspended in 90 parts of water and 100 parts of the polyester granules delustred with titanium dioxide are stirred into the suspension. The mixture is stirred until the preparation has become evenly distributed on the granules, the aqueous phase is decanted and the granules are dried in vacuo at approx. 100°C. The granules treated in this way are intimately mixed with 3,900 parts of untreated granules and spun by melt spinning. Fibres are obtained that possess a particularly attractive and pure shade of white that has excellent fastness to light and washing.

EXAMPLE 13

Ten parts of nitrodibenzanthrone (C.I. Vat Green 9) are dissolved in 100 parts of 96% strength sulfuric acid at 0° to 5°C and poured into 1,000 parts of ice-water. After filtering and washing free of acid, the filtrate is stirred with 90 parts of cyclohexanol whilst removing the water that has separated out.

Ten parts of the preparation obtained in this way are suspended in 90 parts of water and 100 parts of polyester granules are introduced into this suspension. After thorough mixing, the water is decanted and the granules are dried in vacuo. After the shaping, fibres dyed in strong and fast navy blue are obtained.

Navy blue is similarly obtained with 4,4'-diaminoanthrimide-carbazol, whereas with the 4,5-derivative a violet brown and with the 5,5'-diamino derivative a reddish brown are obtained.

EXAMPLE 14

Five parts of triphenylrosaniline are dissolved in 50 parts of cyclohexanol and given to a suspension of 50 parts of polyacrylonitrile powder in 450 parts of water. The mixture is kept for 2 hours in a water bath at 90°C with stirring, the cyclohexanol is distilled off with steam, the residue filtered and the resulting precipitate dried.

Five parts of this preparation are stirred into a 25% strength solution of polyacrylonitrile in dimethylformamide and shaped into films while removing the solvent in a current of hot air. A film is obtained dyed in deep, brilliant and transparent blue.

EXAMPLE 15

One part of the pigment that is formed from 3,3',3'',3'''-phthalocyanintetrasulfonic acid and rosinamine, is ground with 5 parts of cyclohexanone and after addition of 45 parts of water, 100 parts of polyamide-6 granules are added. After thorough stirring, the water is decanted and the granules dried and shaped according to the melt spinning process. A completely transparent and brilliant turquoise blue is obtained.

If one part of the rosamine salt of the dyestuff of formula

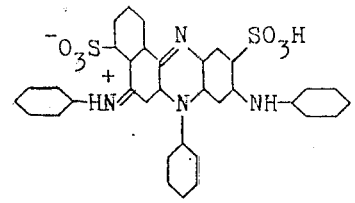

and 10 parts of cyclohexanone are used, 100 parts of polyamide-6 granules are dyed with addition of 90 parts of water, and the process as described above is otherwise carried out, then an equally brilliant reddish blue is obtained.

EXAMPLE 16

Ten parts of N,N'-diisopropyl-dipyrazolanthronyl are dissolved with stirring in concentrated sulfonic acid at 0° to 5°C. This solution is subsequently run in in a fine stream within half an hour beneath the surface of a mixture of 320 parts of ice-water and 80 parts of ethylene chloride. Thereafter 10 parts of polyacrylonitrile in powder form are added in increments while stirring vigorously, and the mixture stirred for a further 1 hour. The acid solution is then decanted, the solvent cake washed with water, mixed with ethanol, filtered and the resulting red powder dried.

Five parts of the powder prepared in this way are stirred into 1,000 parts of a 25% strength solution of polyacrylonitrile and poured out into a film. After the solvent has been removed by the action of heat, a film dyed in strong, brilliant red is obtained that possesses outstanding fastness properties, especially strong fastness to light.

If equal parts of chloroform are used instead of ethylene chloride and the process is carried out otherwise as described above a similarly good result is attained.

EXAMPLE 17

Ten parts of 4,4'-diamino-1,1'-dianthroquinonyl are dissolved with stirring and cooling in concentrated sulfuric acid. This solution is run in beneath the surface of a mixture of 320 parts of ice-water and 80 parts of benzylalcohol. While stirring vigorously, 10 parts of polyacrylonitrile in powder form is thereafter introduced in increments, the mixture stirred for 1 further hour and the acid drained off. After rinsing with water and removing the solvent by steam distillation, the resulting bulky powder is filtered and dried.

Five parts of this powder are used as described in Example 16 and yield an equally excellent red.

If the benzylalcohol is substituted by n-pentanol and the process is carried out otherwise as described above, a similarly good result is obtained.

EXAMPLE 18

The sulfuric acid solution described in Example 17 is run into a mixture of 130 parts of cyclohexanone and 370 parts of ice-water. While shaking vigorously, 10 parts of polyacrylonitrile are introduced, the cyclohexanone removed by injecting steam, the resulting powder filtered, washed free of acid and dried.

By using the powder as indicated in Example 16, an excellent, homogeneous and vivid red is obtained.

If the polyacrylonitrile solution is stretched into fibres instead of being poured out into a film, then fibres dyed in brilliant red resistant to light and weather are obtained.

EXAMPLE 19

Ten parts of quinacridone are dissolved in 100 parts of concentrated sulfuric acid with stirring and cooling. This solution is introduced into a mixture of 320 parts of water and 80 parts of n-pentanol, in the process of which it is acoustically irradiated by ultrasonics with a frequency of 25 kHz. Thereafter an amount of 10 parts of polyacrylonitrile powder is introduced in small increments. After thorough mixing, the acid solution is drained off, the solvent cake washed with water, treated with methanol and the powder isolated by filtration and dried in vacuo.

Five parts of this powder used as indicated in Examples 16 and 18 yield a strong, homogenous violet of remarkable transparency and outstanding fastness properties.

If equal parts of copper phthalocyanine are used instead of quinacridone, and the process as described above is otherwise carried out, films or fibres dyed in brilliant, vivid and transparent blue are obtained.

If instead of quinacridone equal parts of 2,2'-dimethoxy-dibenzanthrone are used and the process as described above is otherwise carried out, a preparation is obtained that yields particularly transparent and brilliant green dyeings.

EXAMPLE 20

Ten parts of indigo are made into a paste in a mixture of 60 parts of cyclohexanone and 10 parts of 20% strength methylalcoholic potassium hydroxide solution with acoustic irradiation with ultrasonicss of 50 kHz. This resulting homogenous paste or colloidal solution is introduced with stirring into a solution of 125 parts of water and 5 parts of glacial acetic acid. Ten parts of polyacrylonitrile in powder form are added in increments with vigorous shaking or stirring, the cyclohexanone removed by steam distillation, and the residue filtered with suction, rinsed and dried. A dark blue powder is obtained that yields, after being used as indicated in Examples 16 and 18, navy blue dyeings of very good transparency and equally good fastness properties.

If one of the dyestuffs of the formulae is used and the process carried out as described for indigo, preparations are obtained that yield excellent reddish yellow or green transparent yellow dyeings.

EXAMPLE 21

The steps described in Examples 16 to 20 are repeated, with the difference that instead of the polyacrylonitrile powder mentioned therein a powder from polypropylene is introduced.

Two parts each of the 50% strength dyestuff preparations obtained in this way are mixed with 98 parts of untreated polypropylene powder, pre-granulated and thereafter spun into fibres according to the melt spinning process.

In all cases, just as excellent results are obtained as on polyacrylontrile.

EXAMPLE 22

The experiments described in Examples 17 to 19 are repeated, with the difference that instead of the polyacrylonitrile powder a powder from polycaprolactam is used.

Two parts each of the 50% strength dyestuff preparations obtained in this way are mixed with 98 parts of untreated polycaprolactam powder, pre-granulated and thereafter shaped into fibres according to the melt spinning process.

In all cases, dyed fibres with excellent fastness properties are obtained.

EXAMPLE 23

Two parts of one of the dyestuff preparations described in Example 21 are ground to a homogenous paste in 10 parts of cyclohexanone. After addition of 90 parts of water, 100 parts of polypropylene are introduced in the form of granules and the whole shaken until these have become evenly coated. The water is decanted and the granules are rinsed and dried in vacuo. They are subsequently spun according to the melt spinning process and similarly good results are obtained as in Example 21.

EXAMPLE 24

Two parts of one of the dyestuff preparations obtained according to Example 22 are ground to a homogenous paste in 10 parts of cyclohexanone and introduced into 90 parts of water. One hundred parts of polyamide-6 in the form of granules are now added thereto and the mixture shaken until they have become evenly coated. The water is decanted and the granules rinsed and dried in vacuo.

The granules are thereafter shaped according to the melt spinning process. Extremely fast and particularly level dyeings are obtained that correspond to those described in Example 22.

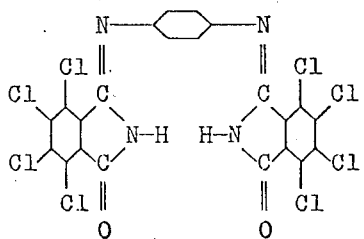
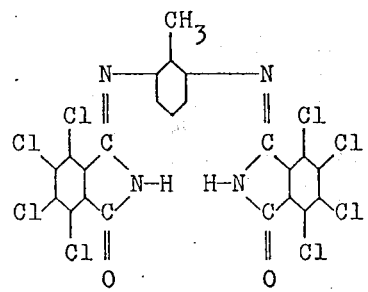

EXAMPLE 25

Six parts of a preparation obtained by kneading equal parts of copper phthalocyanine and magnesium abietate are triturated to a fine suspension in 10 parts of cyclohexanone. The suspension is added in a tumbler to 400 parts of polypropylene granules and 400 parts of water are introduced slowly with shaking. After the granules have become evenly coated, the water is decanted and the granules are rinsed and dried.

The granules are shaped according to the melt spinning process and a fibre possessing excellent fastness properties and a brilliant shade is obtained.

EXAMPLE 26

Eight parts of a preparation obtained by kneading 4 parts of chlorinated copper phthalocyanine and 4 parts of polyamide-6 in powder form are made into a paste in 35 parts of benzylalcohol at 60°C and introduced into 400 parts of water. After addition of 400 parts of polyamide-6 in granule form, the mixture is shaken until the latter have become evenly coated and a further 600 parts of water are added with stirring. The water is decanted and the granules rinsed and dried. The granules are spun according to the melt spinning process and a fibre dyed in excellent, brilliant green is obtained which appears fully homogenous under a light-optical microscope, i.e., no dyestuff particles are visible.

EXAMPLE 27

Eight parts of the dyestuff of formula

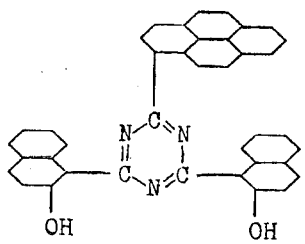

are ground in 20 parts of cyclohexanone until a homogenous, finely dispose paste is formed. After addition of 400 parts of water, 400 parts of polyamide-6 granules are introduced and the whole is shaken until the granules have become evenly coated. The water is decanted and the granules shaped by the melt spinning process after they have been dried in vacuo. A fibre dyed in a strong, greenish yellow shade with very good fastness properties is obtained.

EXAMPLE 28

Ten parts of 1,5-dibenzoylamino-anthraquinone are dissolved in 100 parts of 80% strength sulfonic acid at 0° to 5°C together with 10 parts of polyacrylonitrile powder and precipitated together by pouring the solution in a fine stream into a mixture of 80 parts of n-pentanol and 320 parts of ice-water. The batch is stirred for a further 30 minutes, the aqueous phase decanted, and the resulting yellow powder rinsed, treated with methanol, filtered and dried. A transparent yellow dyeing is obtained by applying the powder in accordance with Example 16.

EXAMPLE 29

Ten parts of diethyl-dipyrazolanthronyl are dissolved in 100 parts of concentrated sulfuric acid and stirred in a fine stream into a mixture obtained by mixing 10 parts of polyacrylonitrile powder with 320 parts of water and subsequently adding 80 parts of 1-hexanol. The batch is stirred intensively with the aid of a vibromixer, and after addition of the sulfuric acid solution, stirred for a further half hour. The aqueous phase is decanted and the resulting red powder rinsed with water, treated with methanol, filtered and dried. In accordance with Example 16, bluish-red dyeings of high fastness and remarkable brilliance and tinctorial strength are obtained.

We claim:

1. A dyestuff preparation consisting essentially of a dispersion or solution of 5 to 75% by weight of a water-insoluble amine salt of a dyestuff selected from the group consisting of 1:2 chromium complex of an azo dyestuff, 1:2 chromium complex of a formazane dyestuff, phthaolcyanine dyestuff, diazine dyestuff, and anthraquinone sulfonic acid dyestuff, in an aliphatic or cycloaliphatic ketone having a solubility in water at room temperature of 0.1 to 10%.

2. The preparation of claim 1 wherein the ketone is selected from the group consisting of methylethylketone and methylisobutylketone.

3. The preparation of claim 1 wherein the ketone is cyclohexanone.

4. The preparation of claim 1 wherein the ketone is saturated with water.

5. The preparation of claim 1 wherein 25 to 50% by weight of a water-insoluble amine salt of a 1:2 chromium complex of an azo dyestuff is dispersed or dissolved in cyclohexanone saturated with water.

* * * * *